(12) United States Patent
De Una Jaime

(10) Patent No.: US 12,271,102 B2
(45) Date of Patent: Apr. 8, 2025

(54) UNIVERSAL DEVICE FOR RELATIVE MOVEMENT BETWEEN THE OPTICAL PLANE AND THE FOCAL PLANE OF A LENS AND A CAMERA

(71) Applicant: Cinema Gear Design, SL, San Sebastian de los Reyes (ES)

(72) Inventor: Sergio De Una Jaime, Saragossa (ES)

(73) Assignee: Cinema Gear Design, SL, San Sebastian de los Reyes (ES)

( * ) Notice: Subject to any disclaimer, the term of this patent is extended or adjusted under 35 U.S.C. 154(b) by 757 days.

(21) Appl. No.: 17/442,101

(22) PCT Filed: Mar. 20, 2020

(86) PCT No.: PCT/ES2020/070197
§ 371 (c)(1),
(2) Date: Sep. 22, 2021

(87) PCT Pub. No.: WO2020/193831
PCT Pub. Date: Oct. 1, 2020

(65) Prior Publication Data
US 2022/0082780 A1 Mar. 17, 2022

(30) Foreign Application Priority Data

Mar. 26, 2019 (ES) ................ ES201930274

(51) Int. Cl.
*G03B 17/56* (2021.01)
*G03B 5/00* (2021.01)
(Continued)

(52) U.S. Cl.
CPC ............ *G03B 17/561* (2013.01); *G03B 5/00* (2013.01); *G03B 5/02* (2013.01); *G03B 5/04* (2013.01); *G03B 5/06* (2013.01); *G03B 17/12* (2013.01)

(58) Field of Classification Search
CPC ... G03B 5/00; G03B 5/02; G03B 5/04; G03B 5/06; G03B 17/12; G03B 17/14;
(Continued)

(56) References Cited

U.S. PATENT DOCUMENTS 4,095,246 A 6/1978 Kellner
5,289,215 A * 2/1994 Clairmont ................ G02B 7/28
352/85
(Continued)

FOREIGN PATENT DOCUMENTS

CN 104991404 A 10/2015
EP 2910998 A1 8/2015
(Continued)

*Primary Examiner* — Clayton E. LaBalle
*Assistant Examiner* — Fang-Chi Chang
(74) *Attorney, Agent, or Firm* — Hinckley Allen & Snyder; Stephen Holmes

(57) ABSTRACT

It consists of a frame (1) for fixing the camera body (2), from whose sides emerge two forks (5) that end in respective articulations (6) for a bridge (7-7') with an inverted "U" configuration, so that the imaginary axis that joins the two joints coincides with the focal plane or sensor of the camera (2). The articulations (6) include means for regulating the inclination of the bridge (7-7'), as well as guiding means (9) for axial displacement of the lateral arms (7') of the bridge, while the beam (7) has longitudinal guiding means (11) for a carriage (12) that is associated below a rotary base (14), whose axis of rotation coincides with the focal plane or sensor of the chamber (2). The rotary base (14) has guide means for a support (17) on which the lens (18) is fixed.

9 Claims, 5 Drawing Sheets

(51) Int. Cl.
*G03B 5/02* (2021.01)
*G03B 5/04* (2021.01)
*G03B 5/06* (2021.01)
*G03B 17/12* (2021.01)

(58) Field of Classification Search
CPC .... G03B 17/56; G03B 17/561; G03B 17/565; G03B 17/566
See application file for complete search history.

(56) References Cited

U.S. PATENT DOCUMENTS

| | | |
|---|---|---|
| 5,592,331 A | 1/1997 | Eastcott |
| 2012/0070141 A1 | 3/2012 | Scholz et al. |

FOREIGN PATENT DOCUMENTS

| | | | | |
|---|---|---|---|---|
| JP | S6269228 U | * | 4/1987 | |
| WO | WO-2008027846 A2 | * | 3/2008 | ............. G03B 17/04 |

* cited by examiner

UNIVERSAL DEVICE FOR RELATIVE MOVEMENT BETWEEN THE OPTICAL PLANE AND THE FOCAL PLANE OF A LENS AND A CAMERA

TECHNICAL FIELD OF THE INVENTION

The present invention relates to a universal device for the relative displacement between the optical plane and the focal plane, allowing the parallel and incidence displacement of the optical axis to the focal plane (plane of the sensor) taking as the axis of said rotation the focal plane itself (sensor or focal point), in order to allow different optical effects, as well as many other applications, which in the photographic/cinematographic field are known as "Tilt-Shift" effects.

The object of the invention is to provide a device for carrying out this type of effects both individually and in combination (any combination of x- and y-axes, in addition to displacement of the left-right and up-down oscillation optical plane and its combinations) in addition to adapting to any type of lens and camera (which allows said movements to be carried out), with the particular feature that the rotation of the optics is carried out with respect to an imaginary axis of rotation located on the focal plane, thus avoiding deformations of the captured image and allowing pivoting at a specific point selected in the focal plane of said rotation of the optics or focal point.

Ultimately, the device of the invention aims to allow the following movements of displacement of the optical plane to be carried out:

Up-down displacement (parallel to the focal plane):
Optical plane SHIFT up (+Y). Offset optical center up
Optical plane SHIFT down (-Y). Offset optical center down
Left-right displacement (parallel to focal plane):
Optical plane SHIFT right (+X). Offset optical center right
Optical plane SHIFT left (-X). Offset optical center left
Front-back inclination (point of rotation in the focal plane):
Optical plane TILT forward (-Tilt°). Tilt the plane of the object toward the ground
Optical plane TILT back (+Tilt°). Tilt the plane of the object towards the sky
Left-right inclination (point of rotation in the focal plane):
Optical plane SWING to the left (-SWING°). Tilt object plane to the left
Optical plane SWING to the right (+SWING°). Tilt object plane to the right
Z motion (longitudinal displacement) to allow adjustment of the different types of lenses and their collimation, depending on the distance of image formation in the focal plane.

STATE OF THE ART

FIG. 1a schematically shows the classical arrangement between the lens (1) and the sensor (2) of a camera when capturing the image of a subject (3), so that the optic provides a focal plane (4), wherein a depth of field (5-5') is established in which the image is clear, so that any element that is outside the range of the depth of field of said focal plane (4) will appear out of focus.

Thus, in a conventional camera, the focal plane is always parallel to the sensor (2).

Now, if what is intended is to obtain an inclined focal plane (4'), that is to say one that adapts to the inclination of the subject (3) so that it appears perfectly focused along its entire length, it is necessary to modify the angle that the lens (1) forms with the sensor (2), as shown in FIG. 1b.

This effect is known as the "Front-Tilt-Swing" effect, and there are specific lenses that allow to carry out an oscillation of the optics with respect to the sensor of the camera in which it is applied, as well as in some cases, to displace the lens in a direction parallel to the sensor, an effect known as "Shift", which allows to change the frame, since the sensor of a camera does not use 100% of the field of view offered by a lens, so that said displacement allows to obtain different frames.

Obviously, having to use a specific type of lens greatly limits the benefits that are intended to be obtained, since in some cases the luminosity of the lens will be decisive, in others the depth of field, in others the focal distance, etc., so that this solution is clearly unsatisfactory. Not to mention the artistic reasons for the choice of lenses, since each type of manufacturer provides different characteristics of color, texture, and quality. This greatly limited the choice of lenses that the artist or technician may want.

However, there is an even greater problem: in this type of lenses the lens rotates about itself, or at best about an intermediate point between it and the sensor (within the lens mount), but never about the focal plane of the sensor, which causes the projected image to deform with respect to the perpendicular, that is, the lines of perspective do not emerge from the focal plane of the sensor.

In addition, these types of devices do not allow the aforementioned "Tilt-shift" effects to be carried out in a combined way, and only one of them, or at most a combination of two of them, must be chosen.

EXPLANATION OF THE INVENTION

The universal device for the displacement between the lens and the focal plane of a lens and a camera that is proposed solves in a fully satisfactory way the problem described above by means of a highly effective and versatile solution.

To this end, and more specifically, the device of the invention is constituted from a frame that acts as a base on which the body of the camera is fixed, regardless of its type, stably arranged and previously devoid of the front mount of the optics.

Said base presents laterally a pair of vertical and inclined arms defining a fork that converge at the point of articulation of a bridge, with an inverted "U" configuration, so that the midpoint of the imaginary axis that would join the two articulations of the bridge on the fork coincides with the focal plane or sensor of the camera.

In correspondence with the fork tilting axes for the bridge, the device shall include means of angular adjustment for said bridge and locking means, whether manual or electronic.

The aforementioned lateral joints of the fork are related to the lateral arms of the bridge through guide means that allow the axial displacement of said lateral arms, which displacement can be carried out by means of a transmission that can be actuated by a manual control, or electronically controlled.

On the vertical beam of the bridge, longitudinal guiding means are provided for a carriage which, as in the previous cases, can be displaced manually, by means of a transmission mechanism associated with a crank arranged on said bridge, or such displacement can be controlled electronically.

Above said carriage emerges from below a rotary base provided with means of angular regulation for same, whether mechanical or electronic. On said rotary base guides are finally established on which a support for the lens is axially displaceable.

These guides make it possible to adjust the focal distance between the lens and the camera sensor, and may include micro-adjustment means at said distance to adjust the collimation.

From this structure, as is conventional the lens is arranged at a certain distance from the sensor; the assembly will be covered by a flexible casing, with the particularity that both the horizontal axis of rotation for the lens that the device presents, as well as the vertical axis of rotation of the rotating base, are aligned with the sensor, contrary to what happens in other lenses:

This, the lens will always rotate with respect to the focal plane of the sensor, preventing deformation of the image, and allowing the adjustment of the incidence of the optics both in Tilt° and Swing° without changing the projection of the image on the focal plane.

This vertical and horizontal rotation is controlled by the means for controlling the rotation of the bridge with respect to the fork and of the carriage with respect to the rolling base, thus making it possible to control the "Tilt" and "Swing" effect.

On the other hand, the longitudinal displacement of the carriage in either direction, as well as the displacement of the lateral arms of the bridge with respect to the fork joints, upward or downward, allow the target to be displaced in the X-Y axes according to the "Shift" effect.

As can be deduced from the above, the horizontal displacement of the carriage, as well as the vertical displacement of the bridge, are not affected by the angular movements offered by the device; therefore, both "tilt-shift" effects can be carried out in combination without limitation in this regard.

Since the targets to be supported could have a considerable weight, it has been foreseen that the bridge may be assisted by at least one damper established between said upper branch of the bridge and the joint with the fork.

Likewise, the fork articulation means could include weight counterbalancing means, in order to optimally stabilize the assembly.

Finally, it should be noted that all the regulation mechanisms described above may incorporate locking means, in order to allow a lens to be replaced by another without having to readjust the device.

This structure provides the following advantages:

The system rotates about the focal plane of the sensor (film, or the selected point), allowing the movements of Tilt and Swing without having to correct the situation of the lens or focal plane.

It allows selecting the center of the focal plane in X or Y off-set to rotate the optical center of the lens about that point.

The two aforementioned features allow modifying the focal plane gradually without having to modify the perspective nor the angle at the point we want to select on the focal plane.

It allows to use any optics of any mount that does not need electronics for its control from the camera body, being able to size the device to support optics of considerable weight.

It allows moving the focal ring regardless of the movement of shift, tilt or swing, i.e., offset or tilt.

It allows using filter holders (approximation and neutral filters).

It allows locking and using in a neutral way with values of 0 both in the X axis and in the Y axis, as well as 0° of tilt and swing.

It is universal, which allows it to be adjusted to all cameras, with the limitations of the dimensions and that the mounts carried by the cameras can be removed.

The cameras do not have to withstand any weight or load.

The data is visible by an electronic interface and sent by connection to other devices.

BRIEF DESCRIPTION OF THE DRAWINGS

To complement the description to be made below and in order to help a better understanding of the characteristics of the invention, in accordance with a preferred example of a practical embodiment thereof, a set of drawings is attached as an integral part of said description, wherein, by way of illustration and not limitation, the following has been represented.

PREFERRED EMBODIMENT OF THE INVENTION

Figure 1A:
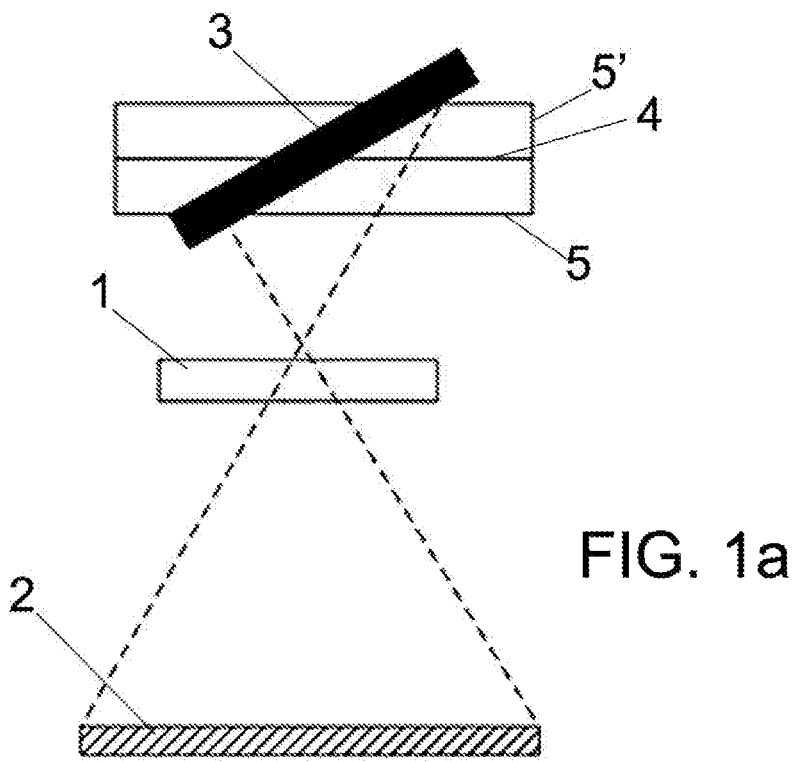
FIGS. 1a-1b show a schematic representation of the conventional focusing method of a camera, and the effect that is achieved when the lens is tilted with respect to the camera sensor.
Figure 1B:
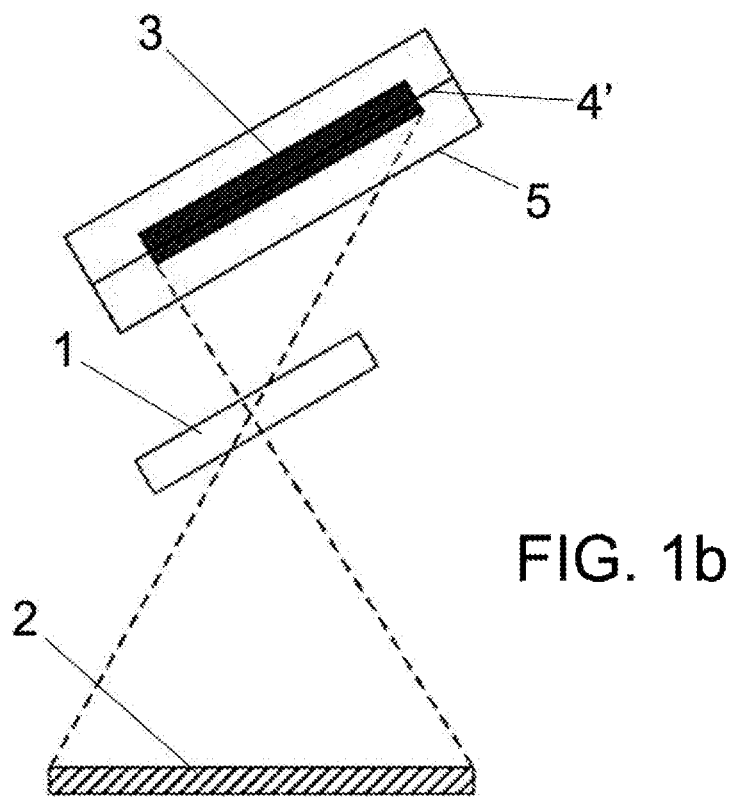

In view of the figures above, it can be seen how the device of the invention is constituted from a frame (1) acting as a base on which the body of the chamber (2) is fixed, through the classic system of rods (3) insertable into orifices (4) made in said frame (1), which presents a flattened configuration, where from the sides thereof emerge two oblique branches of inverted "V" configuration defining a fork (5), at the upper end of which articulations (6) are established for a bridge (7-7') with an inverted "U" configuration, so that the midpoint of the imaginary axis that would join the two articulations of the bridge over the fork coincides with the focal plane or sensor of the camera (2).

Said articulations 6 include means for regulating the inclination of the bridge 7-7', which in the chosen embodiment are embodied in a control 8, but which could also be embodied in electronically controlled motor means.

In the joints (6), guide means (9) are established for axial displacement of the lateral arms (7') of the bridge; this displacement can be carried out through a transmission that can be actuated by means of an upper manual control (10), established on the beam (7) of the bridge, or electronically controlled.

As mentioned above, longitudinal guiding means (11) are established in the bridge beam (7) for a carriage (12) displaceable by means of a lateral control (13) or electronically, the carriage (12) being connected at the bottom to a rotary base (14) whose axis of rotation coincides with the focal plane or sensor of the chamber (2), and where, as in the previous cases, the displacement can be controlled manually, by means of a rear control (15), or electronically controlled.

The rotary base has a pair of guides (16) on which a support (17) is displaceable and lockable, on which the objective (18) is finally fixed.

These guides (16) allow the focal distance between the lens and the camera sensor to be adjusted, and may include micro-adjustment means (19) at said distance for adjusting the collimation.

With this structure, by acting on the controls (10 and 13) one can adjust the displacement of the lens on the axes (X and Y), i.e., control the "Shift", while by acting on the controls (8 and 15) one can adjust the inclination of the lens with respect to the focal plane, i.e., the "Tilt" and "Swing".

All these controls (10, 13, 8, 15, 19) will have locking means (20) for stabilizing the mechanisms associated with them.

As mentioned above, since the lenses (18) to be supported could have a considerable weight, it has been foreseen that the bridge can be assisted by at least one damper (21) established between said upper branch of the bridge and the joint with the fork.

Figure 2:
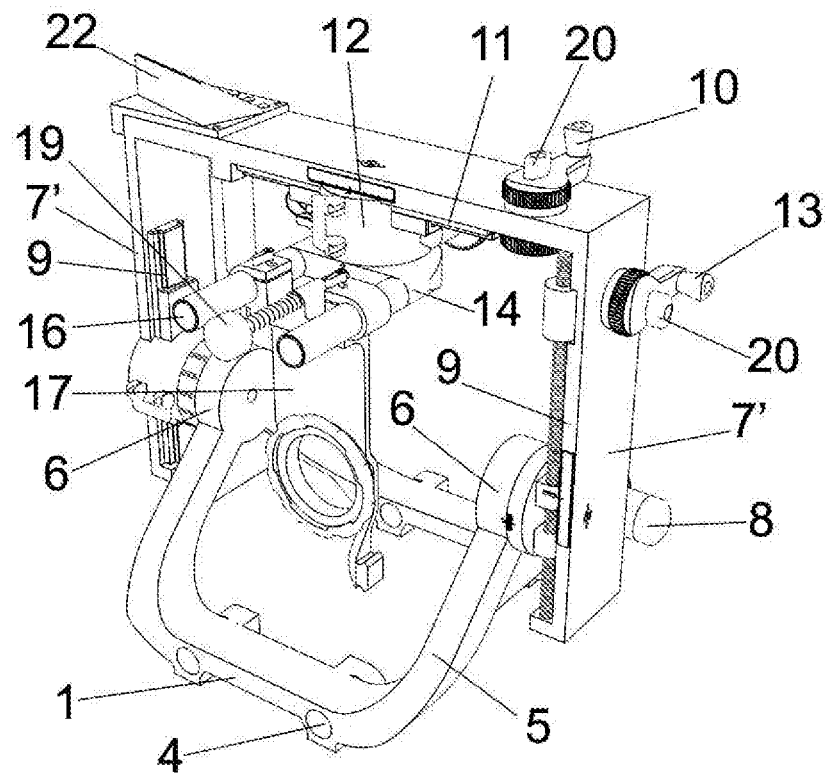
FIG. 2 shows a latero-superior perspective view of a universal device for the displacement between the lens and the focal plane of a lens and a camera made according to the object of the present invention.
Figure 3:
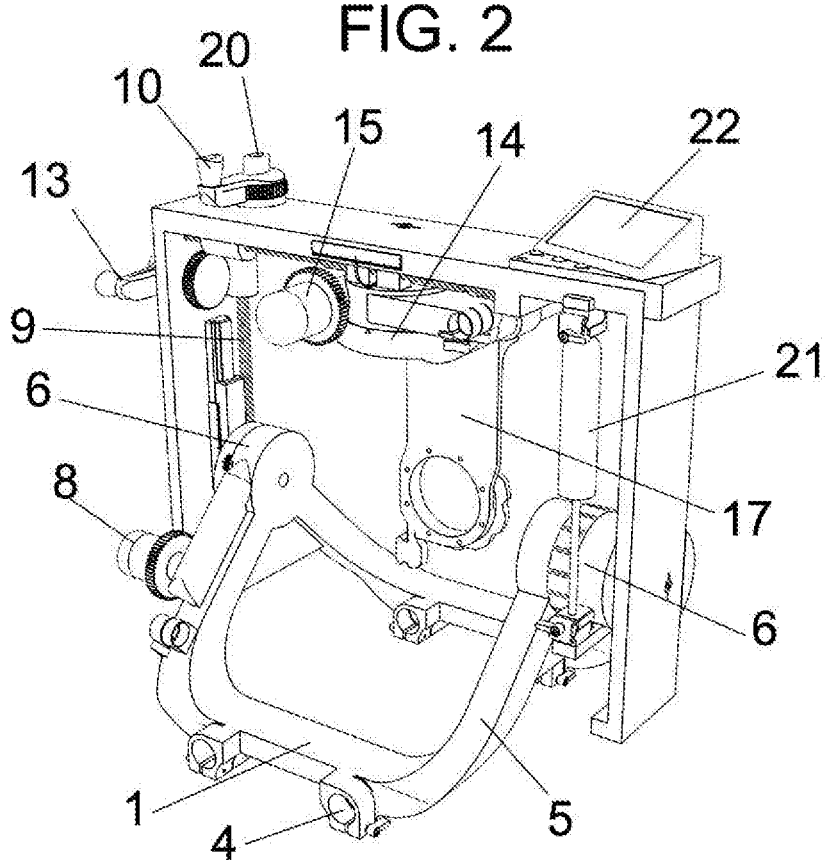
FIG. 3 shows an opposite perspective view of the device of FIG. 2.
Figure 4:
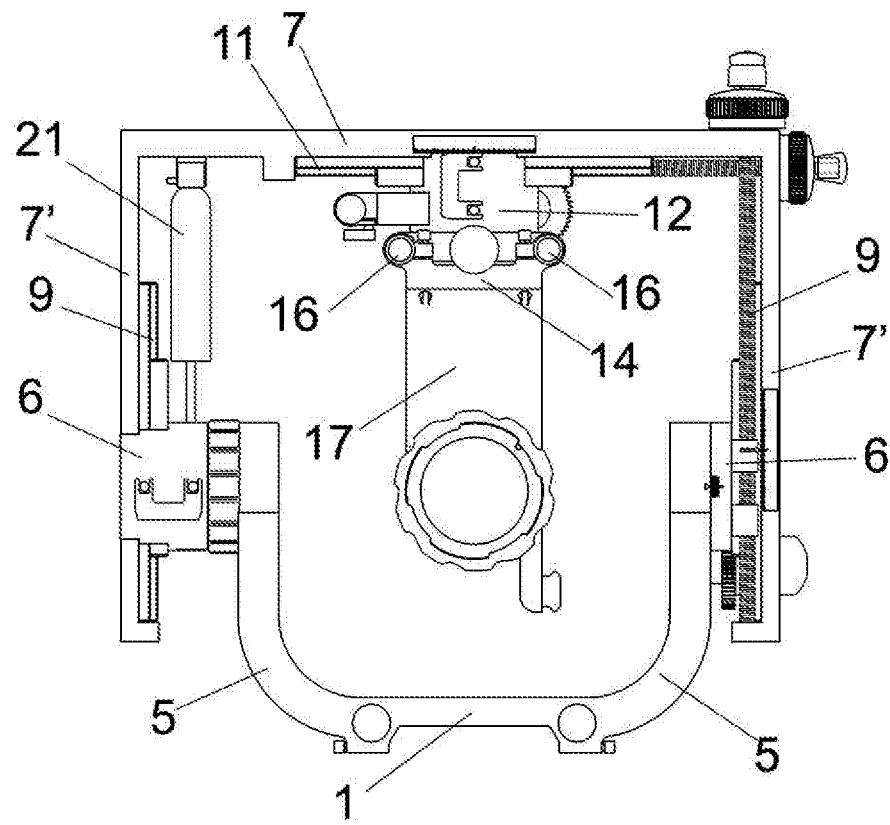
FIG. 4 shows a front view of the device of the invention according to a simpler embodiment variant.
Figure 5:
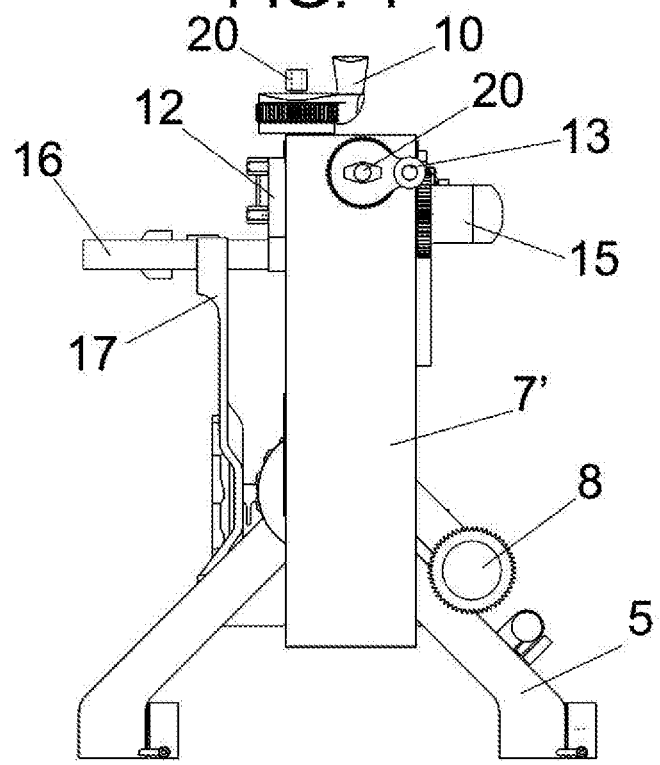
FIG. 5 shows a side view of the device of FIG. 4.
Figure 6:
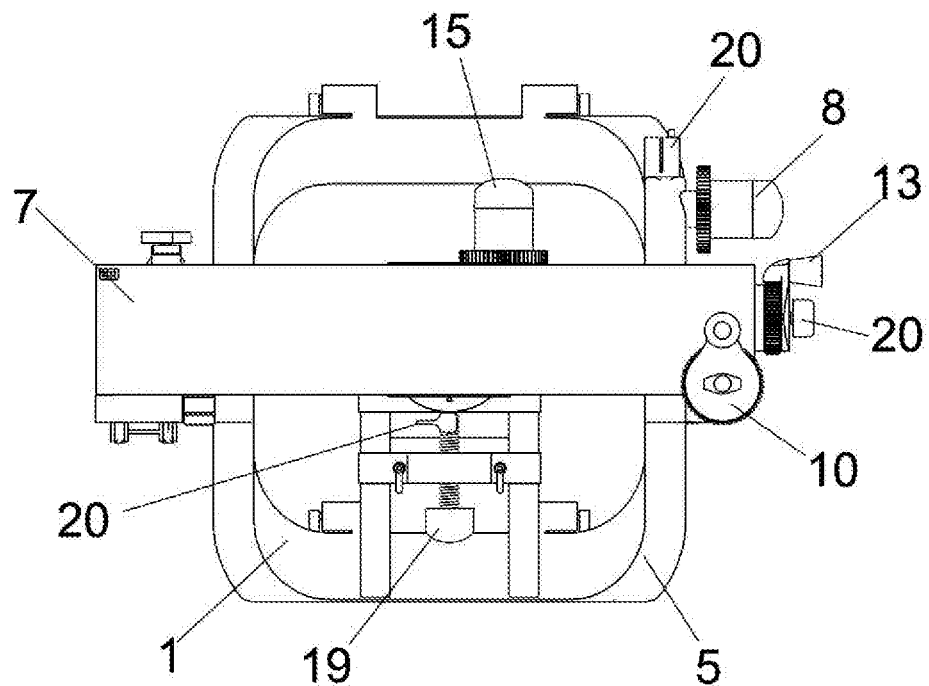
FIG. 6 shows a top plan view of the device in FIG. 4.
Figure 7:
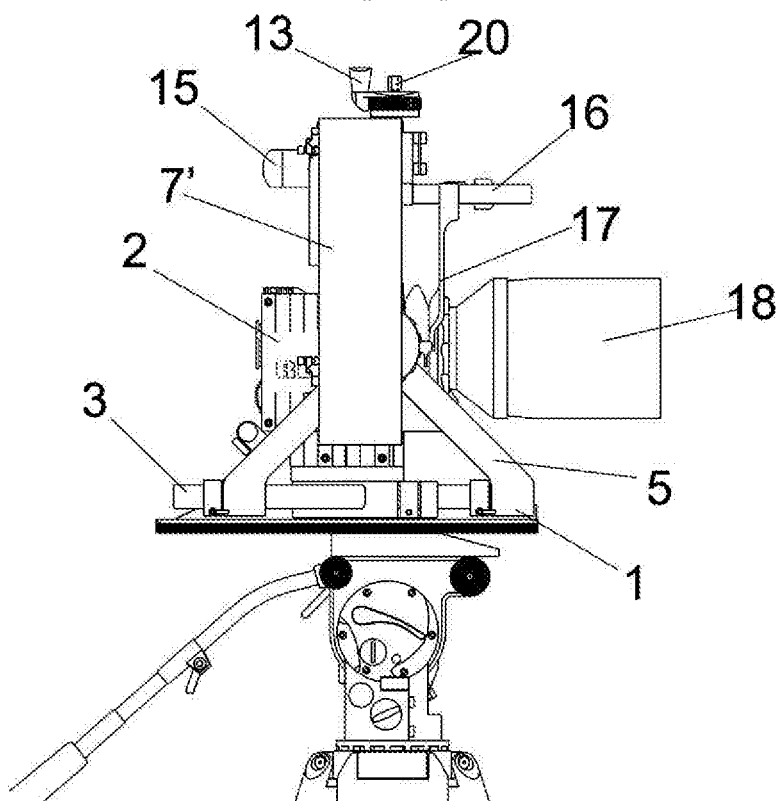
FIG. 7 shows a view similar to FIG. 5, but with the camera and the lenses installed on the device.
Figure 8:
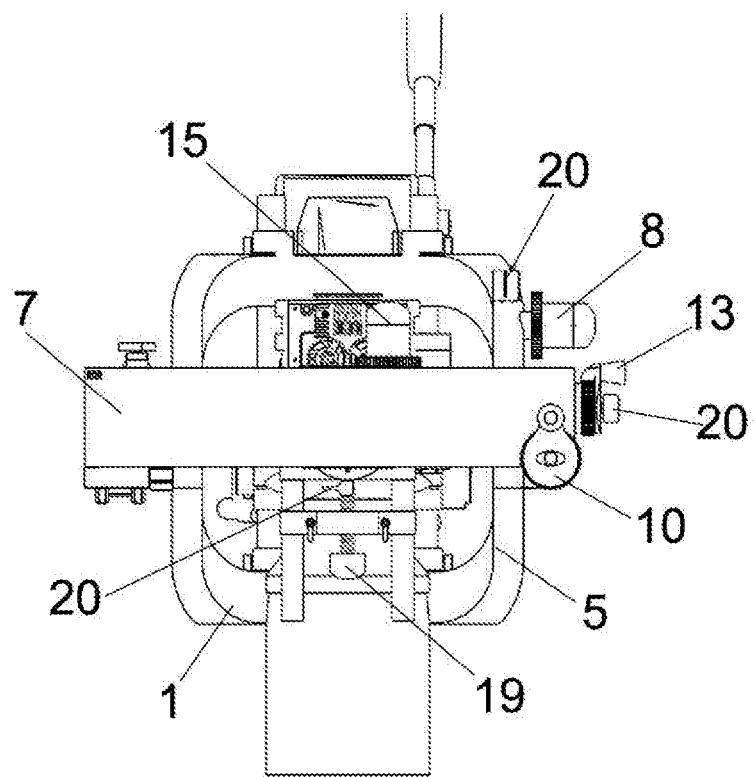
FIG. 8 shows, finally, a plan view of the assembly of FIG. 7.

In the embodiment variant of FIGS. 2 and 3 it can be seen how the device can optionally incorporate a display or screen 22 in which to show the different parameters of the relative position between the camera and lens in millimeters and degrees.

Finally, it should be noted that the development of the device, as could not be otherwise, requires linking some tilting and displacement means with others as it advances in its development from a first means of displacement or tilting, having to choose a "starting point", in this case having chosen the horizontal axis of tilting, to finally obtain each and every one of the preset movements, which are really the objective of the invention, so that it would be evident to a person skilled in the art to develop an equivalent device starting from another "starting point", for example the vertical axis, as the main structure and from it implementing the rest of the mechanisms that offer the degrees of freedom object of the present invention.

The invention claimed is:

1. A universal device for the relative displacement between the optical plane and the focal plane of a lens and a camera, characterized in that it is constituted from a frame (1) that fixes the body of the camera (2), from whose sides emerge forks (5) that end in respective joints (6) for a bridge (7-7'), with an inverted "U" shape, so that the imaginary axis that joins the two joints (6) coincides with the focal plane or sensor of the camera (2); and wherein the joints (6) include means for regulating the inclination of the bridge (7-7') as well as a first guiding means (9) for the axial displacement of a pair of side arms (7') of the bridge, a beam (7) of said bridge having a longitudinal second guiding means (11) for guiding a carriage (12) disposed between the longitudinal second guiding means (11) and a rotating base (14), whose axis of rotation coincides with the focal plane or sensor of the camera (2), the rotating base (14) in turn having a third guiding means (16) for a support (17) on which the lens (18) is fixed.

2. The universal device for the relative displacement between the optical plane and the focal plane of a lens and a camera, according to claim 1, characterized in that the means for regulating the inclination of the bridge (7-7') consist in a transmission associated with a control (8), or else said means for regulating the inclination of the bridge can be electronically controlled.

3. The universal device for the relative displacement between the optical plane and the focal plane of a lens and a camera, according to claim 1, characterized in that the first guiding means (9) for axial displacement of the side arms (7') of the bridge consist in a transmission associated with a control (13), or else said first guiding means (9) for axial displacement of said arms of the bridge can be electronically controlled.

4. The universal device for the relative displacement between the optical plane and the focal plane of a lens and a camera, according to claim 1, characterized in that the longitudinal guiding means (11) for the carriage (12) include a transmission associated with a control (10), or else said longitudinal second guiding means (11) for the carriage (12) can be electronically controlled.

5. The universal device for the relative displacement between the optical plane and the focal plane of a lens and a camera, according to claim 1, characterized in that the rotating base (14) includes a control (15) for angular regulation, or else said angular regulation can be controlled electronically.

6. The universal device for the relative displacement between the optical plane and the focal plane of a lens and a camera, according to claim 1, characterized in that in correspondence with the third guiding means (16) disposed on the rotating base (14) a micro-adjustment means (19) is included for adjusting the collimation.

7. The universal device for the relative displacement between the optical plane and the focal plane of a lens and a camera, according to claim 1, characterized in that the bridge can be assisted by at least one damper (21) established between the beam (7) of the bridge and one of the joints (6) with the corresponding fork (5).

8. The universal device for the relative displacement between the optical plane and the focal plane of a lens and a camera, according to claim 1, characterized in that it includes counterbalancing means.

9. The universal device for the relative displacement between the optical plane and the focal plane of a lens and a camera, according to claim 1, characterized in that it includes a display or screen (22) with information on the relative position between camera and lens.

* * * * *